United States Patent
Tsuchiya

(10) Patent No.: US 9,143,059 B2
(45) Date of Patent: Sep. 22, 2015

(54) VIBRATION WAVE MOTOR

(75) Inventor: Satoshi Tsuchiya, Inagi (JP)

(73) Assignee: Canon Kabushiki Kaisha, Tokyo (JP)

(*) Notice: Subject to any disclaimer, the term of this patent is extended or adjusted under 35 U.S.C. 154(b) by 381 days.

(21) Appl. No.: 13/810,009

(22) PCT Filed: Jun. 29, 2011

(86) PCT No.: PCT/JP2011/065413
§ 371 (c)(1),
(2), (4) Date: Jan. 14, 2013

(87) PCT Pub. No.: WO2012/014640
PCT Pub. Date: Feb. 2, 2012

(65) Prior Publication Data
US 2013/0113340 A1      May 9, 2013

(30) Foreign Application Priority Data

Jul. 26, 2010  (JP) ................. 2010-167578

(51) Int. Cl.
*H02N 2/00*       (2006.01)
*H02N 2/16*       (2006.01)

(52) U.S. Cl.
CPC .............. *H02N 2/009* (2013.01); *H02N 2/163* (2013.01)

(58) Field of Classification Search
USPC .......... 310/311, 323.21, 328, 323.01–323.09, 310/323.11–323.19, 323, 21
See application file for complete search history.

(56) References Cited

U.S. PATENT DOCUMENTS

| | | | |
|---|---|---|---|
| 6,252,332 B1* | 6/2001 | Takagi et al. | 310/323.02 |
| 7,378,777 B2* | 5/2008 | Moteki et al. | 310/323.16 |
| 8,125,120 B2* | 2/2012 | Okazaki | 310/317 |
| 2004/0027032 A1 | 2/2004 | Moteki et al. | |
| 2006/0250048 A1 | 11/2006 | Moteki et al. | |
| 2009/0272404 A1* | 11/2009 | Kim | 134/16 |
| 2010/0091083 A1* | 4/2010 | Itami et al. | 347/261 |

FOREIGN PATENT DOCUMENTS

| | | | |
|---|---|---|---|
| JP | 03-253270 A | 11/1991 | |
| JP | 09-065673 A | 3/1997 | |
| JP | 09-098586 A | 4/1997 | |
| JP | 2002-044968 A | 2/2002 | |
| JP | 2004-289880 A | 10/2004 | |
| JP | 2009-142142 A | 6/2009 | |

OTHER PUBLICATIONS

International Preliminary Report on Patentability mailed Feb. 7, 2013, in International Application No. PCT/JP2011/065413.

* cited by examiner

*Primary Examiner* — Thomas Dougherty
(74) *Attorney, Agent, or Firm* — Fitzpatrick, Cella, Harper & Scinto

(57) ABSTRACT

Provided is a vibration wave motor including: a vibration member having an elastic body joined with a electric-mechanical energy converter; and a moving member contacting the vibration member, the vibration member and the moving member being annularly formed, the vibration wave motor frictionally driving the moving member by a motion generated at a contacting portion with the moving member of the vibration member upon application of an AC signal to the electric-mechanical energy converter. The vibration wave motor includes a centrifugal fan provided at an outer peripheral portion and/or an inner peripheral portion of a circular ring formed of the vibration member and the moving member, and the centrifugal fan rotates integrally with the moving member.

7 Claims, 6 Drawing Sheets

VIBRATION WAVE MOTOR

TECHNICAL FIELD

The present invention relates to a so-called vibration wave motor that frictionally drives a moving member by bringing the moving member into contact with a vibration member. In particular, the present invention relates to a technique for improving a cooling effect of a rotary vibration wave motor.

BACKGROUND ART

In recent years, a vibration wave motor having characteristics such as low speed and large torque has been put to practical use as a driving motor for auto-focus of a photographing lens of a single-lens reflex camera, for example. Meanwhile, there is a demand for further miniaturization and high power of the motor. To achieve miniaturization and high power, countermeasures against heat generation and temperature rise of the vibration wave motor are important for the following reason. Some energy loss, i.e., a part not used as output energy among input energy to the vibration wave motor, is that converted into thermal energy. However, when the vibration wave motor is miniaturized and increased in power, the amount of generated energy loss per volume and per surface area increases. These deteriorate functions of constituent members of the vibration wave motor, and cause a temperature rise which affects its performance. For this reason, countermeasures against heat generation and temperature rise of the vibration wave motor are important.

To deal with such a problem, Japanese Patent Application Laid-Open No. H03-253270 discloses a vibration wave motor including a cooling fan that rotates integrally with a moving member. Additionally, Japanese Patent Application Laid-Open No. H09-065673 discloses a vibration actuator in which a radiator fin that rotates integrally with a moving member also serves as a cooling fan.

CITATION LIST

Patent Literature

PTL 1: Japanese Patent Application Laid-Open No. H03-253270
PTL 2: Japanese Patent Application Laid-Open No. H09-065673

SUMMARY OF INVENTION

Technical Problem

However, in the above mentioned related art, to achieve further miniaturization and high power of the vibration wave motor, a satisfactory cooling effect of the vibration wave motor is not always obtained, and thus there is a demand for improvement of the cooling effect.

The present invention has been made in view of the above-mentioned problem, and has an object to provide a vibration wave motor capable of further improving a cooling effect compared to the related art.

Solution to the Problem

A vibration wave motor according to the present invention includes: a vibration member having an elastic body joined with a electric-mechanical energy converter; and a moving member contacting the vibration member, the vibration member and the moving member being annularly formed, the vibration wave motor frictionally driving the moving member by a motion generated at a contacting portion with the moving member of the vibration member upon application of an AC signal to the electric-mechanical energy converter. The vibration member and the moving member are in contact with each other through a friction member. The vibration wave motor includes a centrifugal fan provided at an outer peripheral portion and/or an inner peripheral portion of a circular ring formed of the vibration member and the moving member, and the centrifugal fan rotates integrally with the moving member.

Advantageous Effects of Invention

The present invention achieves a vibration wave motor capable of further improving a cooling effect compared to the related art.

Further features of the present invention will become apparent from the following description of exemplary embodiments with reference to the attached drawings.

DESCRIPTION OF EMBODIMENTS

Figure 1:
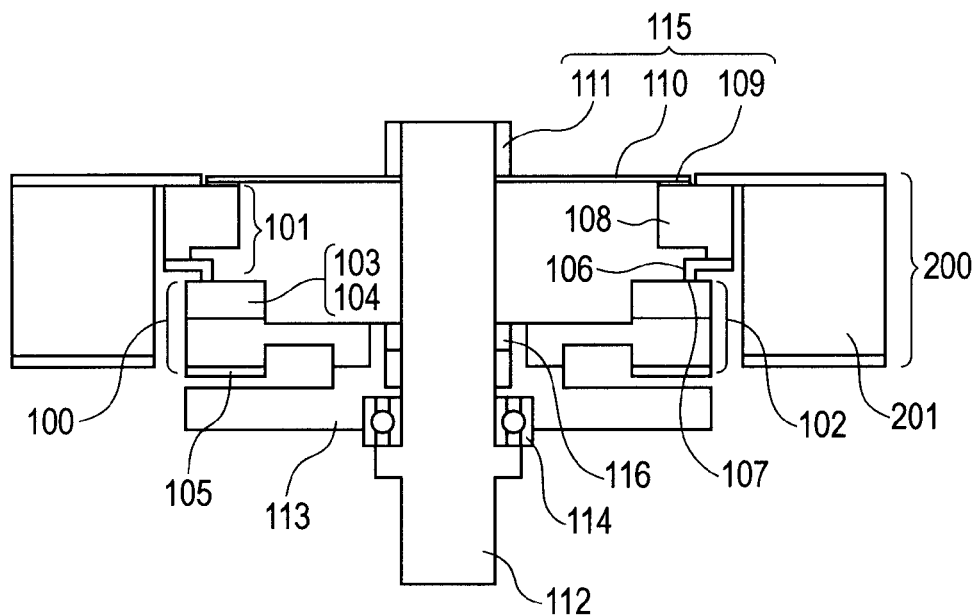
FIG. 1 is a sectional view illustrating a structure of a vibration wave motor according to a first embodiment of the present invention.

A vibration wave motor according to an embodiment of the present invention will be described. The vibration wave motor according to this embodiment includes a vibration member having an elastic body joined with an electric-mechanical energy converter, and a moving member contacting the vibration member and these members are annularly formed. The vibration member and the moving member are brought into contact with each other, and the moving member is adapted to be frictionally driven by a motion (typically an elliptic motion) generated at a contacting portion with the moving member of the vibration member upon application of an AC signal to the electric-mechanical energy converter.

In this case, a centrifugal fan is provided at an outer peripheral portion and/or an inner peripheral portion of a circular ring formed of the vibration member and the moving member. The centrifugal fan is rotated integrally with the moving member, and an air flow is generated in the rotation radial direction of the vibration wave motor, thereby enabling direct air-cooling of the contacting portion. Thus, in a temperature distribution during driving of the vibration wave motor, the contacting portion, the temperature of which becomes the highest, is directly air-cooled to thereby increase the cooling efficiency, suppress a temperature rise of the vibration wave motor, and reduce deterioration of the performance. Further, the centrifugal fan and the moving member are integrally formed, thereby further improving the cooling effect of the centrifugal fan.

In the present invention, a friction member may be provided between the vibration member and the moving member in order to suppress abrasion at the contacting portion between the vibration member and the moving member, or in order to efficiently transmit vibration of the vibration member to the moving member. When the friction member is provided, the friction member and the centrifugal fan may be integrally formed to thereby further improve the cooling effect of the centrifugal fan. Furthermore, the friction member and the centrifugal fan are integrally formed of the same member (which can be made of a good conductor of heat that has a predetermined mechanical strength), thereby improving the heat transmission efficiency. Frictional heat generated at the contacting portion is efficiently transmitted by heat conduction to blades of a centrifugal fan for cooling, so that the blades can serve as radiator fins to transmit the heat from the surfaces of the blades to an outside air. Consequently, the centrifugal fan allows further promotion of heat transmission from the blades to the outside air by an air flow generated by rotation.

Moreover, the centrifugal fan, which is provided at the outer peripheral portion and/or the inner peripheral portion, and the friction member are integrally formed to be joined with a vibration attenuation member constituting the moving member, thereby enabling reduction of noise. Also in this case, the centrifugal fan and the friction member are formed of the same member (which can be made of a good conductor of heat that has a predetermined mechanical strength), thereby improving the heat transmission efficiency. More specifically, since the friction member receives a driving vibration from the vibration member because the moving member contacts the vibration member through the friction member and is frictionally driven, when the blades of the fan and the friction member are integrally formed of the same member, the blades of the fan vibrate integrally with the friction member, and thus noise may occur. However, when these are joined with the vibration attenuation member, vibration to the blades of the fan is blocked, thereby enabling reduction of noise generated by the blades of the fan.

In the present invention, a plurality of protrusions for displacing and enlarging vibration may be provided as needed on a side in contact with the moving member of the elastic body. The plurality of protrusions is provided so that the number of gaps (also referred to as grooves) between the plurality of projection parts and the number of blades constituting the centrifugal fan are not an integral multiple of each other, thereby further improving the cooling effect of the centrifugal fan.

When an airflow rate is increased to improve the cooling effect of the centrifugal fan, a periodic air flow varies depending on a positional relationship between an air flow passing through the gaps between the protrusions (grooves between the protrusions) provided on the vibration member, and an air flow passing between the blades of the fan, so that noise may occur. Further, the variations in the periodic air flow are assumed to occur in the plurality of grooves and the blades simultaneously. Thus, when a number of air flows vary at the same time, the sound pressure level of the noise increases. In this case, when the number of grooves and the number of blades are not an integral multiple of each other, the simultaneous occurrence of variations in the periodic air flow may be reduced. Furthermore, when the number of the grooves and the number of the blades are set to be prime to each other, the cooling effect of the centrifugal fan may be further improved. The term "prime to each other" used herein should be understood to have the same meaning as "coprime" or "relatively prime". Those terms are used for a configuration where the number of the gaps between the protrusions and the number of the blades of the fan do not share a common divisor other than 1 and −1.

Hereinafter, embodiments of the present invention will be described.

First Embodiment

Figure 2:
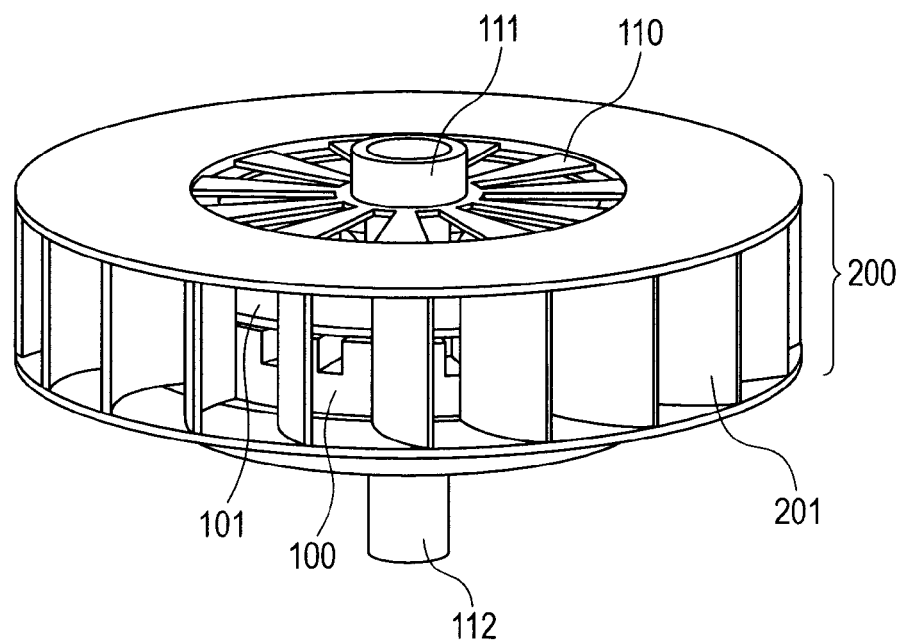
FIG. 2 is a perspective view illustrating the structure of the vibration wave motor according to the first embodiment of the present invention.
Figure 3:
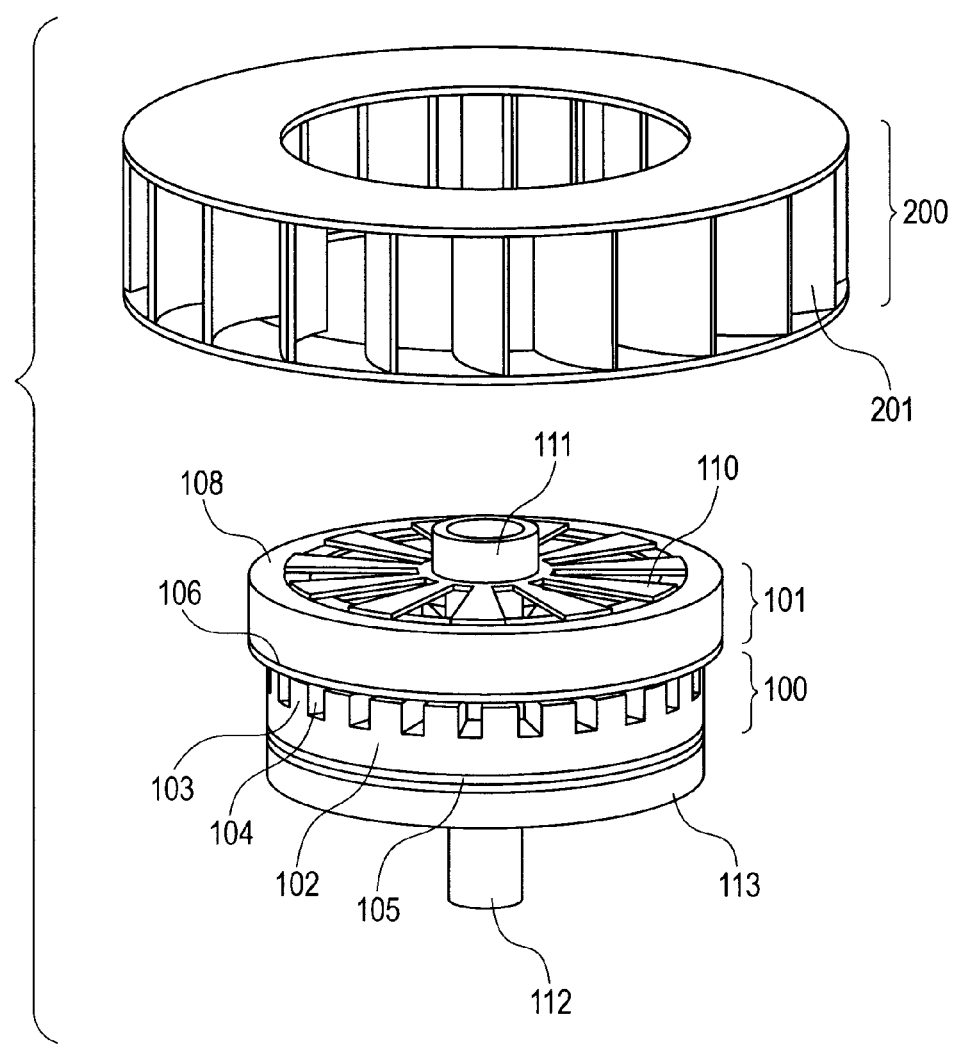
FIG. 3 is a perspective view of the vibration wave motor according to the first embodiment of the present invention from which an external fan is dismounted.

In a first embodiment, an exemplary structure of a vibration wave motor to which the present invention is applied is described with reference to FIG. 1, FIG. 2 and FIG. 3.

As illustrated in FIG. 1, the vibration wave motor of this embodiment includes a vibration member 100, a moving member 101, a vibration member fixing member 113, a bearing 114, and an output shaft 112. The vibration wave motor further includes pressure unit 115 and a centrifugal fan (hereinafter, external fan) 200 for external cooling which includes a plurality of blades 201.

Next, components other than the external fan 200 and the drive principle of the vibration wave motor are described. The vibration member 100 is annularly formed of an elastic body 102 made of metal, and a piezoelectric element 105 adhered to the elastic body 102. The piezoelectric element 105 is an electric-mechanical energy converter that converts an electrical quantity into a mechanical quantity. On a surface opposite to the adhesive surface of the piezoelectric element of the elastic body 102, protrusions 103 for enlarging an amplitude in a driving direction are formed. Between these protrusions, grooves 104 are formed.

The moving member 101 is annularly formed of a friction member 106 adhered to a vibration attenuation member 108 made of metal. The friction member 106 has an L-shaped cross-section, and the leading end of the friction member 106 contacts the protrusions 103 of the vibration member 100.

The pressure unit 115 is annularly formed of a pressure rubber 109, pressure springs 110, and a pressure spring fixing member 111 which are made of metal. The pressure spring fixing member 111 is fit into the output shaft 112. The pressure springs 110 are fixed to the pressure spring fixing member 111, thereby bringing the moving member 101 and the vibration member 100 into contact with each other by pressure through the pressure rubber 109. As illustrated in FIG. 2 and FIG. 3, the pressure springs 110 include plate springs radially arranged.

The vibration member fixing member 113 fixes the vibration member 100 by caulking. The output shaft 112 is held by the bearing 114 and a slide bearing 116, which are held by the vibration member fixing member, and thus is rotatably mounted.

When the vibration wave motor is driven, an AC voltage is applied to the piezoelectric element 105, thereby exciting progressive waves in the vibration member 100. Since the protrusions 103 of the vibration member 100 and the friction member 106 are brought into contact with each other by pressure at a contacting portion 107, the moving member 101 rotates due to friction. When the moving member 101 rotates, the torque thereof is transmitted to the output shaft 112 through the pressure rubber 109, the pressure springs 110, and the pressure spring fixing member 111.

The external fan 200 is adhered to the vibration attenuation member 108 so as to obtain a thermal conductivity. The external fan 200 is formed into a sirocco fan shape so that an air flow is generated in a rotation radial direction when the external fan 200 rotates integrally with the moving member 101. That is, the blades 201 each have a shape with a curvature in the radial direction, although each of the blades 201 is illustrated as a quadrangular shape in the sectional view of FIG. 1. Further, while the external fan has a sirocco fan shape in this embodiment, other centrifugal fans such as a turbo fan may also be employed.

The external fan 200 rotates integrally with the moving member 101 which rotates based on the drive principle described above. When the external fan 200 rotates, roughly two types of air flow are generated, which cools the vibration wave motor. One is an air flow that enters into the vibration wave motor from the space between the radially formed pressure springs 110, passes through the grooves 104 formed in the vibration member 100, and passes through the blades 201 toward the outside in the radial direction. The other is an air flow that enters from the space between the vibration member 100 and the external fan 200 and passes through the blades 201 toward the outside in the radial direction.

The air flows to be generated are strengthened by changing the shape of the blades 201 and the number of rotations of the external fan 200, thereby improving the cooling effect. At this time, the first air flow described above may generate noise. Therefore, in order to reduce the noise, the number of the grooves 104 of the vibration member 100 and the number of the blades 201 of the external fan 200 are not desirably an integral multiple of each other. For example, when the number of the grooves 104 is 22, the number of the blades 201 is a value other than integral multiples of 11 such as 11, 22, 44, 66, and 88. Additionally, in order to reduce the noise, the number of the grooves 104 and the number of the blades 201 are desirably prime to each other. When the number of the grooves is 23, the number of the blades 201 may be 20. In the figures illustrating this embodiment, the number of the grooves is 23 and the number of the blades is 20.

Second Embodiment

As a second embodiment, an exemplary structure of a vibration wave motor in a different mode from that of the first embodiment is described with reference to FIG. 4 and FIG. 5. Components of the vibration wave motor other than the fans and the drive principle are the same as those of the vibration wave motor of the first embodiment, so the description thereof is omitted.

Figure 4:
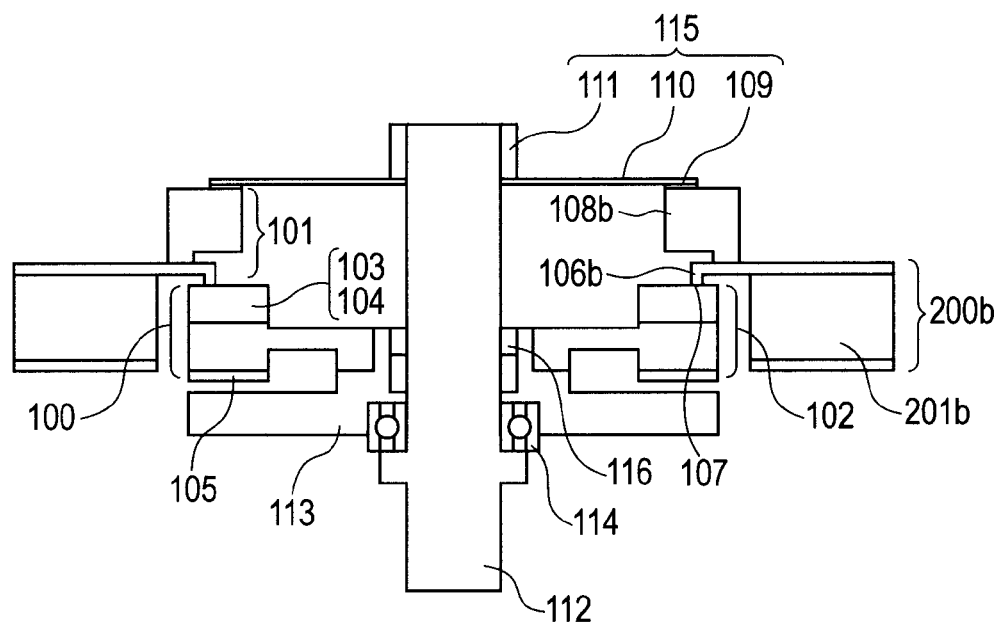
FIG. 4 is a sectional view illustrating a structure of a vibration wave motor according to a second embodiment of the present invention.
Figure 5:
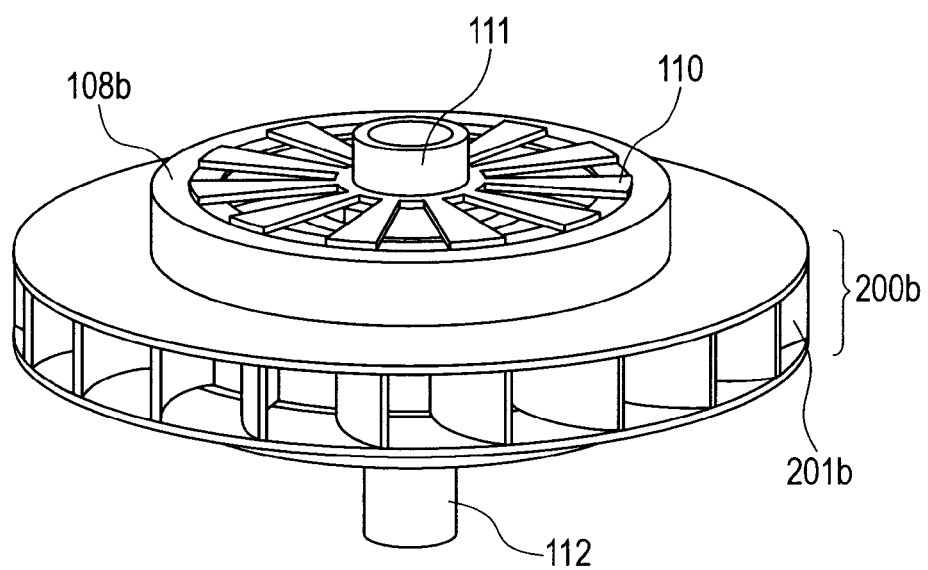
FIG. 5 is a perspective view illustrating the structure of the vibration wave motor according to the second embodiment of the present invention.

As illustrated in FIG. 4 and FIG. 5, the vibration wave motor of this embodiment includes a friction member 106b and an external fan 200b which are integrally formed of the same member. Since the friction member 106b and the external fan 200b are integrally formed of the same member, frictional heat generated at the contacting portion 107 is liable to be transmitted to blades 201b of the external fan 200b, and the effect of the blades 201b as radiator fins is improved. The air flows and air-cooling effect due to rotation of the external fan 200b are the same as those of the external fan 200 of the first embodiment.

The friction member 106b and the blades 201b of the external fan are adhered to a vibration attenuation member 108b. Thus, noise generated due to vibration of the blades 201b can be reduced. The number of the blades 201b is not set to an integral multiple of the number of the grooves 104. Accordingly, the noise generated by air flows passing through the grooves 104 can be reduced. Furthermore, the number of the blades 201b is desirably prime to the number of the grooves 104.

Third Embodiment

As a third embodiment, an exemplary structure of a vibration wave motor in a different mode from that of the first and second embodiments is described with reference to FIG. 6 and FIG. 7. Components of the vibration wave motor other than the fans and the drive principle are the same as those of the vibration wave motors of the first and second embodiments, so the description thereof is omitted.

Figure 6:
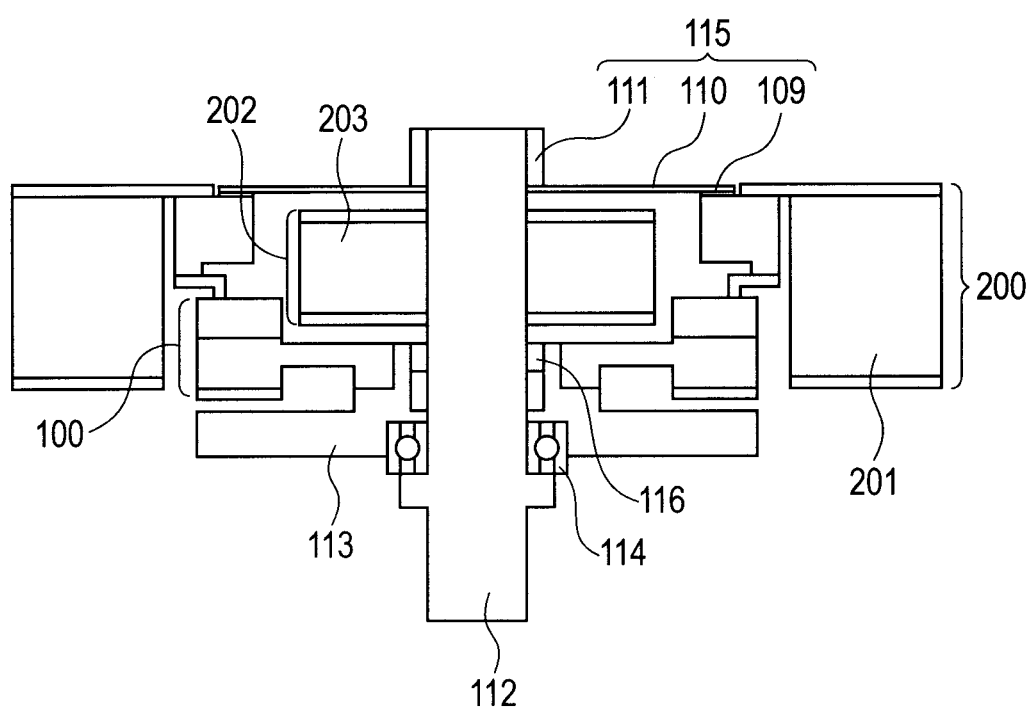
FIG. 6 is a sectional view illustrating a structure of a vibration wave motor according to a third embodiment of the present invention.
Figure 7:
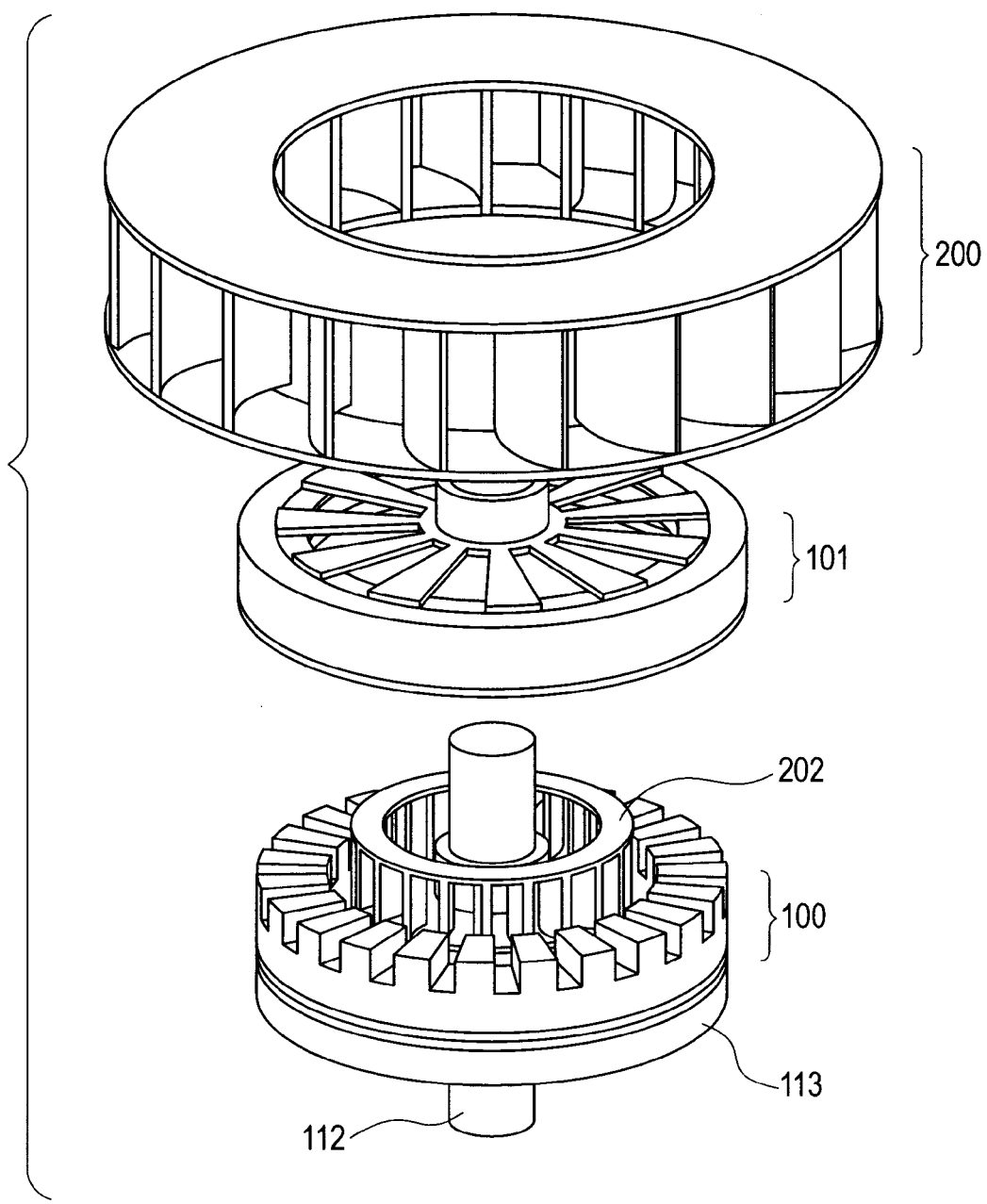
FIG. 7 is a perspective view of the vibration wave motor according to the third embodiment of the present invention from which an external fan and a moving member are dismounted.

As illustrated in FIG. 6 and FIG. 7, the vibration wave motor of this embodiment includes the external fan 200 and a centrifugal fan (hereinafter an internal fan) 202 for internal cooling. The external fan 200 has the same structure and effects as the external fan 200 of the first embodiment. The internal fan 202 is disposed in a space surrounded by the vibration member 100, the moving member 101, and the pressure springs 110. The internal fan 202 is fit into the output shaft 112, and rotates integrally with the moving member 101 and the output shaft 112.

Like the external fan 200, the internal fan 202 has a sirocco fan shape. The internal fan 202 generates an air flow by rotation of the vibration wave motor. The flow path enters from the space between the pressure springs 110, is lowered to the space between the internal fan 202 and the output shaft 112, passes through blades 203 of the internal fan 202 toward the outside in the radial direction, and passes between the grooves 104 of the vibration member 100.

The number of the blades 201 and the number of the blades 203 may not be an integral multiple of the number of the grooves 104. Thus, the noise generated due to air flows passing through the grooves 104 can be reduced. Further, the number of the blades 201 and the number of the blades 203 are desirably prime to the number of the grooves 104. In this embodiment, the internal fan 202 is fit into the output shaft, but the internal fan may be joined with the vibration attenuation member 108.

Fourth Embodiment

As a fourth embodiment, an exemplary structure of a vibration wave motor in a different mode from that of the first, second and third embodiments is described with reference to FIG. 8A. Components of the vibration wave motor other than the fans and the drive principle are the same as those of the vibration wave motors of the first to third embodiments, so the description thereof is omitted.

Figure 8A:
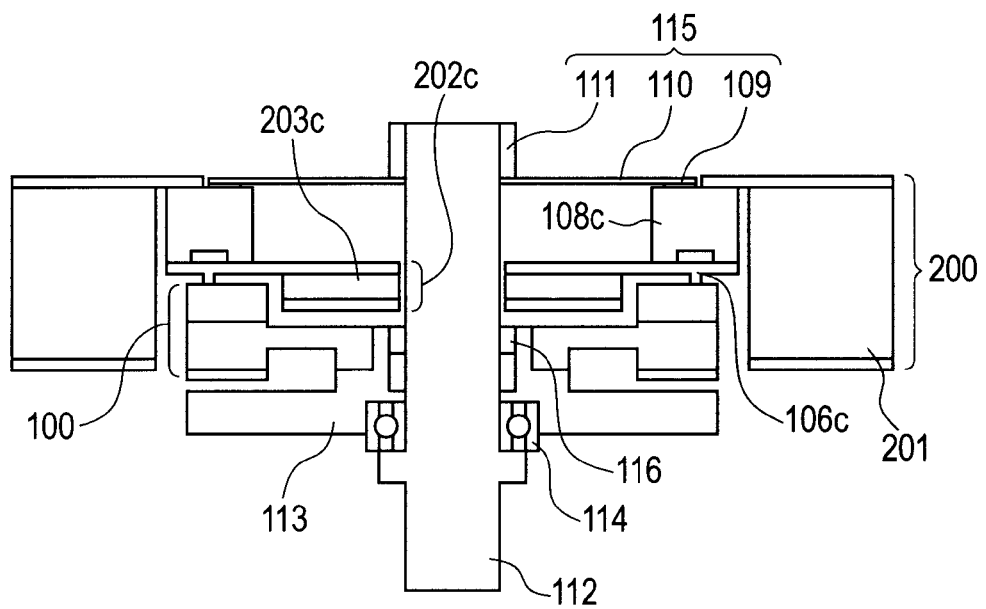
FIG. 8A is a sectional view illustrating a structure of a vibration wave motor according to a fourth embodiment of the present invention.

As illustrated in FIG. 8A, the vibration wave motor of this embodiment includes an internal fan 202c and the external fan 200. The external fan 200 has the same structure and effects as the external fan 200 of the first embodiment. The internal fan 202c includes blades 203c of a plurality of internal fins. The blades 203c of the internal fan and a friction member 106c are integrally formed of the same member.

Since the blades 203c of the internal fan and the friction member 106c are integrally formed of the same member, the function of the blades 203c of the internal fan as radiator fins is improved. The air flows and air-cooling effect due to rotation of the internal fan 202c are the same as those of the internal fan 202 of the third embodiment.

The blades 203c of the internal fan and the friction member 106c are adhered with a vibration attenuation member 108c. Thus, the noise generated due to vibration of the blades 203c can be reduced.

The number of the blades 201c and the number of the blades 203c are not an integral multiple of the number of the grooves 104. Thus, the noise generated due to air flows passing through the grooves 104 can be reduced. Furthermore, the number of the blades 201c and the number of the blades 203c are desirably prime to the number of the grooves 104.

Figure 8B:
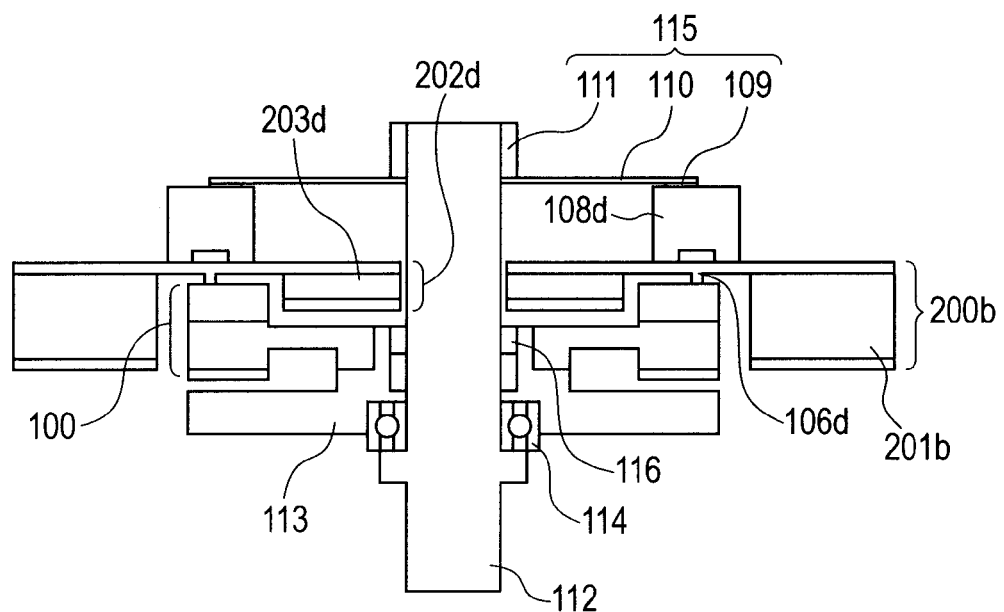
FIG. 8B is a sectional view of the vibration wave motor according to a modified example of the fourth embodiment of the present invention.

FIG. 8B illustrates a sectional view of a vibration wave motor according to a modified example of this embodiment.

In the vibration wave motor illustrated in FIG. 8A of this embodiment, the blades 201 of the external fan and the friction member 106c are not integrally formed of the same member. Meanwhile, as illustrated in FIG. 8B, blades 201d of the external fan and a friction member 106d are all integrally formed of the same member, thereby further improving the cooling effect. This is because both the blades 203d of the internal fan and the blades 201d of the external fan can serve as radiator fins.

Moreover, while in this embodiment an internal fan 202d does not contact the output shaft 112, the internal fan 202d may contact the output shaft 112. In this case, frictional heat generated at the contacting portion 107 can be discharged to the output shaft 112 through the friction member 106d and the internal fan 202d, thereby improving the cooling effect.

Though the above first to fourth embodiments have exemplified the vibration wave motors including only the external fan or two types of internal and external fans, the vibration wave motor may include only the internal fan. In this case, the cooling effect can be improved without increasing the size of the vibration wave motor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-167578, filed Jul. 26, 2010, which is hereby incorporated by reference herein in its entirety.

The invention claimed is:

1. A vibration wave motor comprising:
   a vibration member including an elastic body joined with an electric-mechanical energy converter;
   a moving member contacting the vibration member, the vibration member and the moving member having an annular shape;
   a friction member between the vibration member and the moving member; and
   a centrifugal fan provided on at least one of an outer peripheral portion and an inner peripheral portion of the vibration member and the moving member,
   wherein the centrifugal fan is arranged to rotate integrally with the moving member, and
   wherein, in a cross-section including an axis of the annular shape, the centrifugal fan includes a portion which is opposed to the friction member, a part of the vibration member, and a part of the moving member.

2. The vibration wave motor according to claim 1, wherein the centrifugal fan and the friction member are integrally formed of the same member.

3. The vibration wave motor according to claim 2, wherein the moving member has a structure in which the friction member is joined with a vibration attenuation member, and
   wherein the centrifugal fan is joined with the vibration attenuation member.

4. The vibration wave motor according to claim 1, wherein the moving member has a structure in which the friction member is joined with a vibration attenuation member, and
   wherein the centrifugal fan is joined with the vibration attenuation member.

5. The vibration wave motor according to claim 1,
   wherein the elastic body includes a plurality of projection parts on a side on which the moving member is provided, and
   wherein neither the number of gaps between the plurality of projection parts nor the number of blades constituting the centrifugal fan is an integral multiple of the other.

6. The vibration wave motor according to claim 1,
   wherein the elastic body includes a plurality of projection parts on a side on which the moving member is provided, and
   wherein the number of gaps between the plurality of projection parts and the number of blades constituting the centrifugal fan are prime to each other.

7. The vibration wave motor according to claim 1, wherein the vibration wave motor frictionally drives the moving member by a motion generated by application of an AC signal to the electric-mechanical energy converter.

* * * * *